July 17, 1956  M. N. LUDLOW  2,755,126
AUXILIARY SUN VISOR
Filed June 18, 1953
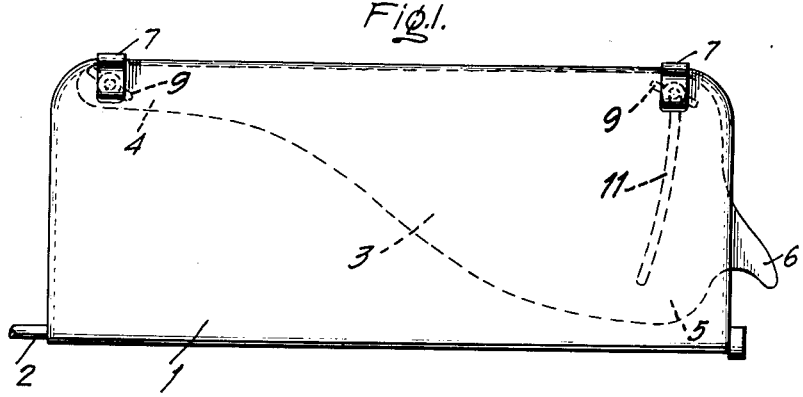
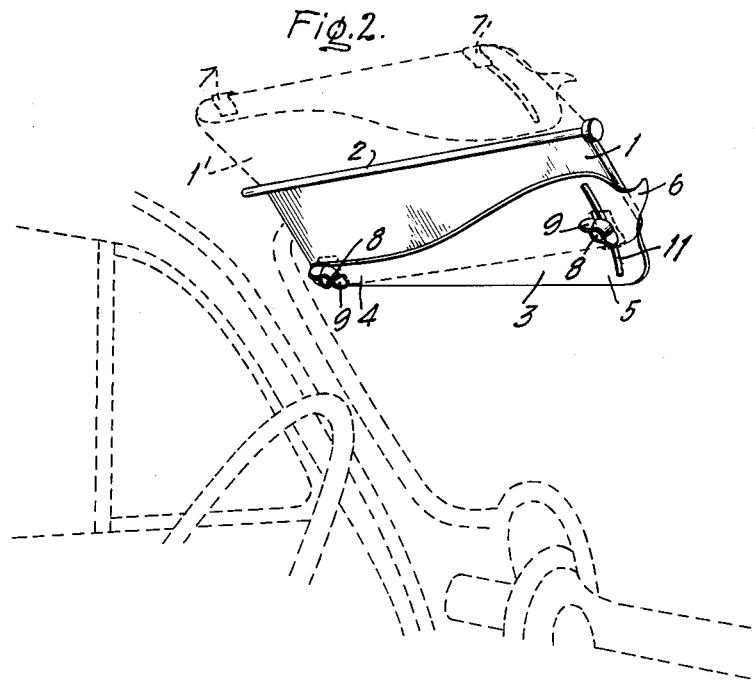
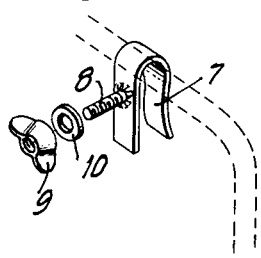
Inventor:
Margery N. Ludlow,
by
Her Attorneys.

United States Patent Office 2,755,126
Patented July 17, 1956

2,755,126
AUXILIARY SUN VISOR

Margery N. Ludlow, North Bennington, Vt.

Application June 18, 1953, Serial No. 362,494

4 Claims. (Cl. 296—97)

My invention relates to sun visors which are adapted for attachment to the ordinary sun visors with which practically all present day motor vehicles are equipped. The present visors generally comprise a rectangular frame which is covered with a fabric, and which is mounted within the body of the vehicle adjacent the windshield and which may be swung upwardly against the top of the vehicle or downwardly in front of a portion of the windshield to prevent the rays of the sun, when it is comparatively low in the heavens, from blinding the vehicle operator.

When the sun is at or near the horizon, the ordinary visors are of little or no value in preventing the sun from shining in the eyes of the operator because they cannot extend down far enough to cut off the rays of the sun without obscuring the operator's vision of the road over which the vehicle is traveling.

One of the objects of my invention is to provide an auxiliary sun visor which is adapted for attachment to the ordinary visors with which motor vehicles are now equipped and which may be swung downwardly beyond the lower limits of the regular visors, and which is of such shape that while it will cut off the sun's rays from shining in the eyes of the operator, it will not obscure the operator's vision of the road ahead. Another object is to provide an auxiliary visor of this type which may be readily attached to and detached from the ordinary sun visor without damage thereto. Another object is to provide an auxiliary visor which, when attached to an ordinary visor, will be substantially invisible when the ordinary visor is folded upwardly against the interior top of the vehicle body. A further object is to provide a device of this character which, together with its attaching means, is of simple construction and may be fabricated at a comparatively low cost.

I accomplish these objects by the means described below and illustrated in the accompanying drawings in which—

Fig. 1 is an elevation view of an ordinary sun visor having my auxiliary visor attached to what is the back of the regular visor when upturned against the interior top of the vehicle body but which will be in front of the regular visor when the regular visor is swung downwardly;

Fig. 2 is a perspective view showing in dotted outline a fragmentary portion of a motor vehicle body with my visor attached to the regular sun visor and pulled part way downwardly to cut off rays of the sun which otherwise would pass beneath the regular visor and tend to blind the operator; and Fig. 3 is a perspective view of one of the clips for attaching my auxiliary visor to the regular vehicle visor.

Referring to the drawings—

1 is the ordinary sun visor which is attached to a rod 2 about which it may be swung downwardly into the position shown in Fig. 2 but which is normally swung upwardly against the interior top of the body of the vehicle as shown in dotted outline at 1' in Fig. 2.

My auxiliary visor is represented in dotted outline at 3 in Fig. 1 and in solid outline in Fig. 2. It is formed of opaque sheet material, preferably plastic, and it is preferably shaped somewhat like a paddle in that it is comparatively narrow at the end 4 and substantially wider at the end 5. It is approximately of the same length as the ordinary sun visor of a vehicle but, at the wider end, is provided with a projecting portion 6 adapted to be engaged by the finger of the operator for pulling it downwardly, as shown in Fig. 2, or pushed upwardly into the position shown in Fig. 1. In order readily to attach and detach the auxiliary visor from the regular visor without injury thereto, I provide two resilient, bifurcated clips 7 which are best shown in Fig. 3. These clips are adapted to embrace and frictionally engage the opposite sides of the regular sun visor. Each of these clips is provided with a stud 8 and a wing nut 9, and a washer 10 is preferably interposed between the clips 7 and the wing nut 9. My auxiliary visor is provided, closely adjacent the end of the narrower portion thereof, with a hole adapted to receive one of the studs 8 for pivotally connecting my visor thereto. My visor, adjacent the other end thereof, is provided with an arcuate slot 11 having its center substantially at the hole through the narrower end of the visor which receives the stud 8. The stud on the other visor passes through the slot 11 as best shown, perhaps, in Fig. 2.

From the foregoing, it will be apparent that my auxiliary visor may be readily attached to a regular sun visor by simply pressing the clips 7 over an edge of the regular visor.

It will also be apparent that the normal position of my visor will be on top of the regular visor and therefore substantially invisible when the regular visor is upturned. When the regular visor is downturned, my auxiliary visor may be swung downwardly by first loosening the wing nuts 9 and then tightening at least the wing nut on the stud passing through the slot 11 to secure the auxiliary visor in the desired position.

What I claim is:

1. An auxiliary sun visor for a motor vehicle; said visor comprising a strip of opaque sheet material substantially wider at one end than the other, of a length approximating the length of a sun visor of the type which is positioned adjacent the inner side of a motor vehicle windshield, and of a width at the wider end approximating that of said vehicle visor; means, including a first resilient, bifurcated clip, secured to the narrower end of said auxiliary visor and adapted merely to embrace and frictionally engage the vehicle visor adjacent an edge thereof for pivotally securing said auxiliary visor to said vehicle visor to swing in a plane parallel to said vehicle visor; and a manually operable clamp adjacent the wider end of said auxiliary visor and cooperating therewith provided with a second resilient clip, similar to said first clip secured to said auxiliary visor adjacent the wider end thereof for attaching it to said vehicle visor for clamping said auxiliary visor in a desired position after it has been swung about its pivotal connection to said vehicle visor.

2. The structure set forth in claim 1 in which said auxiliary visor has a small portion thereof projecting beyond the wider end thereof adapted to be engaged by the finger for swinging said visor.

3. An auxiliary sun visor for a motor vehicle; said visor comprising a strip of opaque sheet material substantially wider at one end than the other, of a length approximating the length of a sun visor of the type which is positioned adjacent the inner side of a motor vehicle windshield, and of a width at the wider end approximating that of said vehicle visor; means, including a first resilient, bifurcated clip, secured to the narrower end of said auxiliary visor and adapted merely to embrace and frictionally engage the vehicle visor adjacent an edge thereof for pivotally securing said auxiliary visor to said vehicle visor to swing in a plane parallel to said vehicle visor; said auxiliary visor having an arcuate slot therein adjacent the wider end thereof with its center at said pivotal securing means; and manually operable means, for clamping said auxiliary visor in any position to which it may be swung, extending through said slot and provided with means, including a second resilient clip similar to said first clip, for attaching it to said vehicle visor.

4. The structure set forth in claim 3 in which said auxiliary visor has a small portion thereof projecting beyond the wider end thereof adapted to be engaged by the finger for swinging said visor.

References Cited in the file of this patent

UNITED STATES PATENTS

| | | |
|---|---|---|
| 1,613,364 | Thompson | Jan. 4, 1927 |
| 1,775,486 | Clements | Sept. 9, 1930 |
| 1,864,015 | Fotakis | June 21, 1932 |
| 2,054,325 | Jacobs | Sept. 15, 1936 |
| 2,101,901 | Fletcher | Dec. 14, 1937 |
| 2,184,360 | Nichols | Dec. 26, 1939 |
| 2,226,056 | Fletcher | Dec. 24, 1940 |
| 2,231,641 | Schwab | Feb. 11, 1941 |
| 2,252,716 | Levy | Aug. 19, 1941 |

FOREIGN PATENTS

| | | |
|---|---|---|
| 634,997 | France | Dec. 10, 1927 |
| 848,460 | Germany | Sept. 4, 1952 |